United States Patent [19]
Diehl

[11] 3,792,947
[45] Feb. 19, 1974

[54] MOLDING APPARATUS

[76] Inventor: Alan V. Diehl, 11144 Wystone Ave., Northridge, Calif. 91324

[22] Filed: July 10, 1972

[21] Appl. No.: 269,967

[52] U.S. Cl.................. 425/411, 425/193, 425/450
[51] Int. Cl.............................................. B29h 5/22
[58] Field of Search ... 425/193, 406, 407, 408, 409, 425/410, 411, 412, 450

[56] References Cited
UNITED STATES PATENTS

| | | | |
|---|---|---|---|
| 2,386,641 | 10/1945 | Trockle et al. | 425/411 X |
| 2,718,030 | 9/1955 | Collins et al. | 425/411 |
| 2,983,953 | 5/1961 | Borah | 425/411 X |
| 3,128,501 | 4/1964 | Borah | 425/411 X |
| 3,142,093 | 7/1964 | Tribbett | 425/406 |
| 3,204,292 | 7/1965 | Schon | 425/411 X |
| 3,307,220 | 3/1967 | Underwood | 425/411 X |

*Primary Examiner*—J. Howard Flint, Jr.
*Attorney, Agent, or Firm*—Robert E. Geauque

[57] ABSTRACT

A hot molding apparatus wherein as the molding elements are removed from the heated molding press, the upper molding element moves along a cam surface which causes initial separation of the molding elements, a linkage assembly connected between said molding elements to produce wide separation of the molding elements adjacent the outward extremity of the movement of said molding elements.

11 Claims, 13 Drawing Figures

PATENTED FEB 19 1974 3,792,947

MOLDING APPARATUS

BACKGROUND OF THE INVENTION

The field of this invention relates to molding apparatuses and more particularly to a molding apparatus which is to effect the molding operation through the application of heat with the normal molding product being a rubber composition.

The conventional form of molding apparatus employs the use of a pair of molding elements which are to be placed together which form a mold cavity therebetween. These molding elements are to be moved in and out of a press. Upon sufficient heat energy being applied to the mold elements to produce the molding operation, the mold elements are normally manually removed from the press. After the manual removal of the molding elements, a hoisting mechanism is attached to the upper mold element in order to separate the molding elements. The operator in turn then extracts the molded elements from the mold cavities, loads raw rubber in the cavities, and then replaces the upper mold element in contact with the lower mold element. The molding operation is then ready to be repeated.

The major disadvantages of the conventional procedure is that the operator must wear gloves to avoid burning himself since the molding elements are heated to approximately 300° F. However, even though operators wear gloves, they frequently do injure themselves.

Additionally, it takes a substantial period of time in order to manually remove the molding elements, apply the hoisting mechanism to the upper molding element, and then operate the hoist in order to separate the upper molding element from the lower molding element. After the molded parts are removed, it takes a period of time in order to replace the upper molding element upon the lower molding element and then disconnect the hoisting mechanism. The molding elements then must be manually moved back into the molding press. This procedure is substantially time consuming which results in a relatively few number of parts that can be produced by a single operator within a given period of time.

Another disadvantage of the conventional molding apparatuses is that the upper molding element must be initially pried open in order to effect a breaking of the seal between the upper molding element and the lower molding element. This prying is normally accomplished through the use of a pry bar which again is a manual operation exposing the operator to potential injury as well as being a time consuming operation.

SUMMARY OF THE INVENTION

The primary objective of the apparatus of this invention is to produce an automatic means to extract molding elements from the press and to automatically separate the upper molding element from the lower molding element. As a result, the molding apparatus of this invention provides easy access by the operator to remove the mold parts while the molding elements are still quite hot. Additionally, the operator is not required to do any physical handling operations such as manually removing the molding elements or prying the molding elements apart. A further advantage of the apparatus of this invention is that the larger molding apparatuses, because of their inherent weight, were required to be operated by men only. However, with the apparatus of this invention the larger molding apparatus can be operated by women because no physical handling of the molding elements is required. The mold handling apparatus of this invention is attached to the lower platen of a molding press. The upper and lower platens of the press are heated by electric heaters or steam or fluid. The heating media may be located in the mold handling device instead of the platens of the press.

The molding elements are to be movable between a first position within a press to a second position which is exteriorly located of the press. As the molding elements are lineally moved from the first position and the second position, a follower means which is connected to the upper moving element, is moved along a cam. The structure of the cam results in the initial breaking of the seal between the upper molding element and the lower molding element. Continued lineal movement of the molding element results in a wide separation occurring between the upper molding element and the lower molding element. This wide separation is caused through the employment of a linkage assembly which is connected between the upper molding element and the lower molding element. There are three embodiments of linkage assemblies shown and described within this application. Each of the embodiments results in a significant pivoting action of a main link of the linkage assembly which results in a substantial spacing of the upper molding element from the lower molding element.

DETAILED DESCRIPTION OF THE SHOWN EMBODIMENTS

Figure 1:
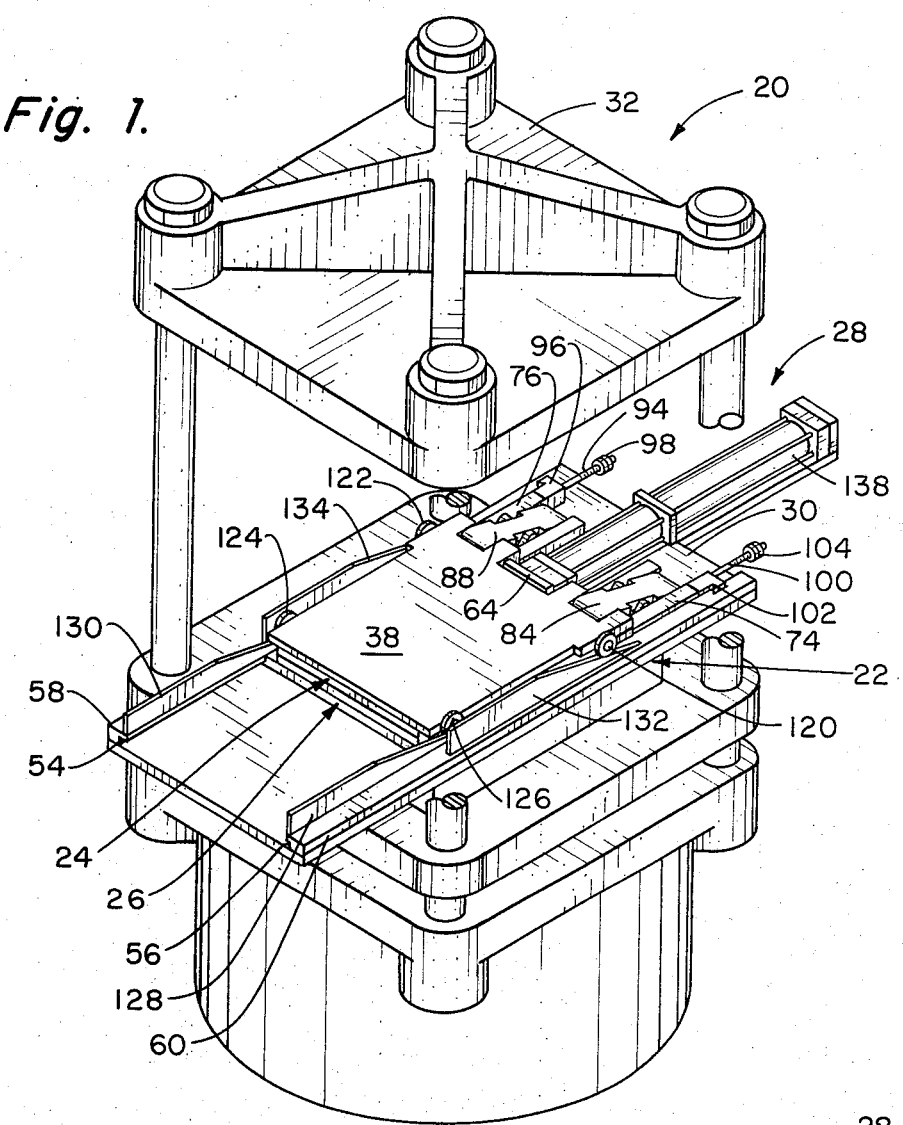
FIG. 1 is an overall isometric view of the molding apparatus of this invention.
Figure 2:
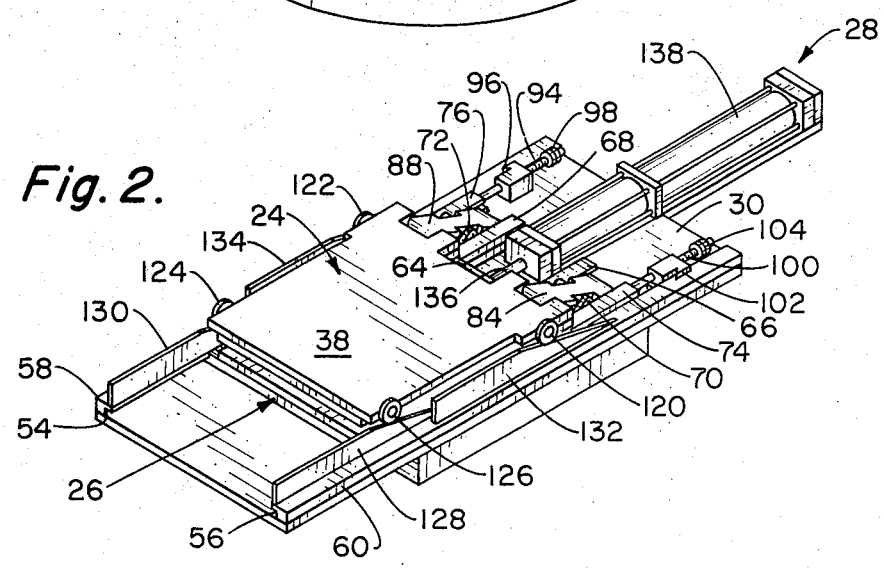
FIG. 2 is an isometric view of the automatic molding element removal apparatus which is employed within this invention.

Referring particularly to the drawings, there is shown in FIG. 1 an overall molding apparatus 20 being generally composed of a housing 22, upper molding element 24, lower molding element 26, and an automatic movement apparatus to move the molding elements in and out of the housing 22. The housing 22 includes a base plate 30 to which is mounted an automatic moving apparatus 28. It is to be understood that the base plate 30 is movable with respect to upper plate 32 of the housing 22. An actuating means, not shown, is to effect movement of the base plate 30 adjacent the upper plate 32 when the molding elements 24 and 26 are located therebetween. It is further to be understood that when the base plate 30 is located adjacent the upper plate 32, heat energy from the heat source would be applied to the molding elements 24 and 26.

Figure 3:
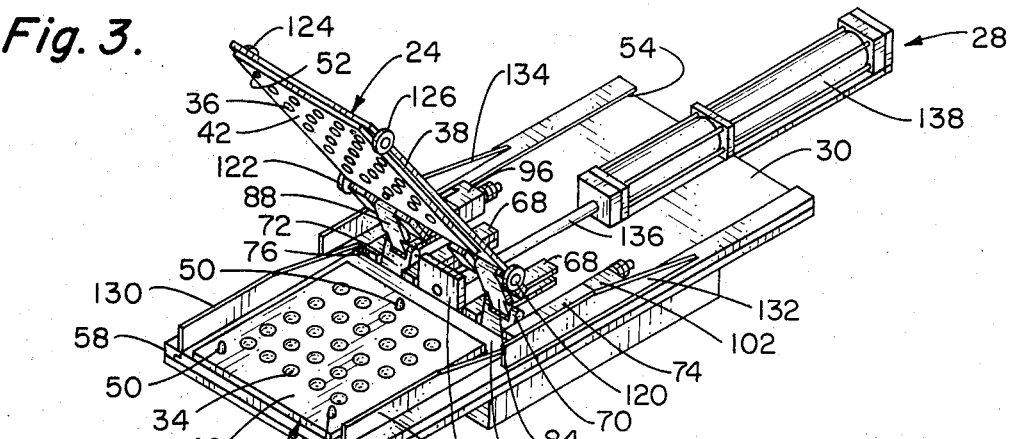
FIG. 3 is a view similar to FIG. 2 but showing the upper molding element being spaced a substantial distance from the lower molding element.
Figure 4:
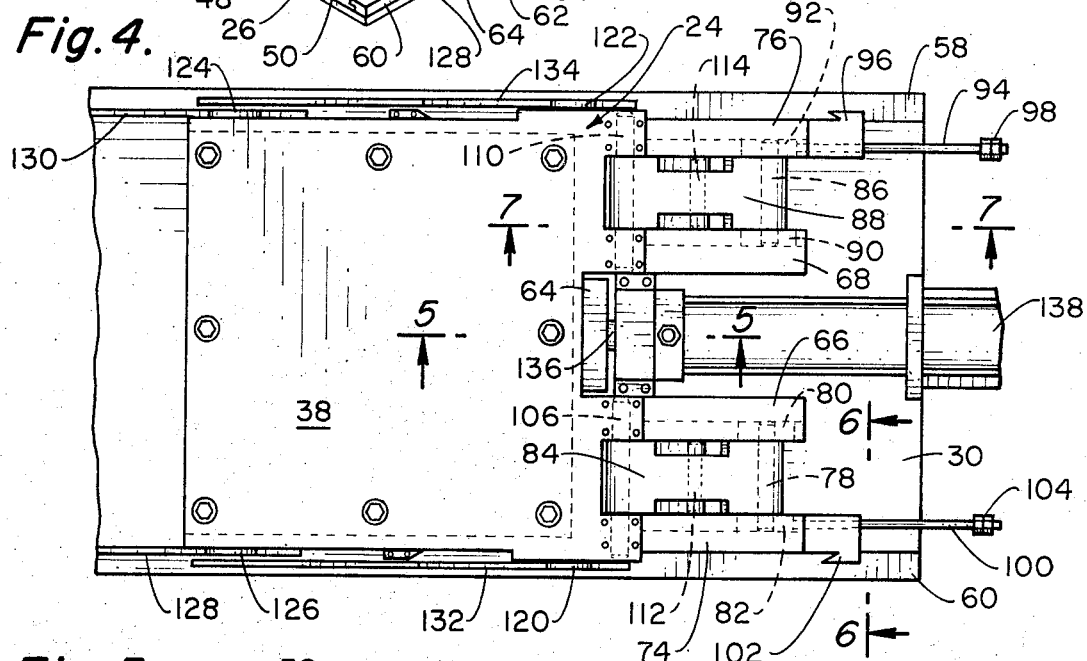
FIG. 4 is a plan view of a portion of the molding apparatus of this invention.
Figure 5:
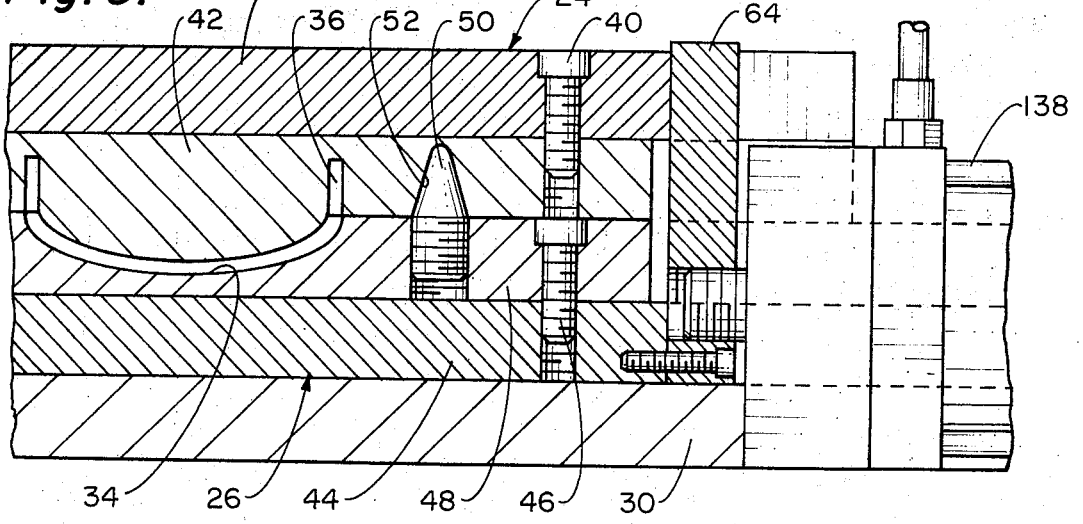
FIG. 5 is a cross-sectional view through a portion of the apparatus of this invention taken on line 5—5 of FIG. 4.
Figure 6:
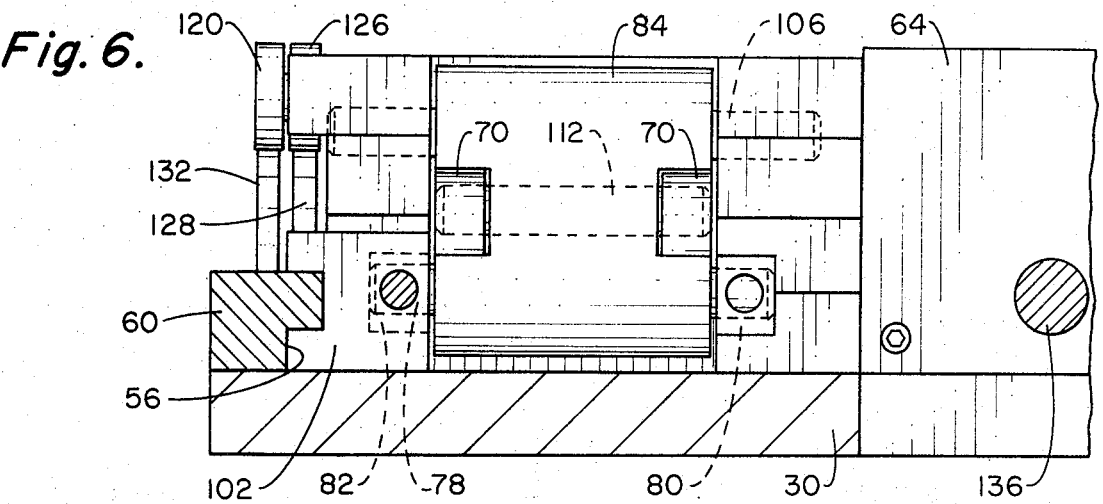
FIG. 6 is a cross-section through a portion of the apparatus of this invention taken along line 6—6 of FIG. 4.

The lower molding element 26 is shown to include a plurality of mold cavities 34. Also, the upper molding element 24 includes a plurality of mold cavities 36. The mold cavities 34 and 36 are merely shown for purposes of description. In reference to FIG. 3 of the drawings, it can be seen that a substantial number of molded parts will be made with each molding operation. However, it is to be understood that the molding elements 24 and 26 can cooperate to form only a single molded part, a great number of molded parts, or a few number of molded parts.

The upper molding element 24 includes an outer plate 38 to which is frictionally secured by means of fasteners 40 top mold plate 42. The top mold plate 42 contains the mold cavities 36. The lower molding element 26, in a similar manner, includes an outer plate 44 in which is attached by fasteners 46 to a bottom mold plate 48. The outer plate 44 is movably mounted upon the base plate 30. Located within the bottom mold plate 48 are the mold cavities 34. Secured within the inner plate 48 are a plurality of aligning pins 50. The aligning pins 50 are to cooperate within corresponding apertures 52 when the upper mold element 24 is located in position upon the lower mold element 26.

It is desirable that the movement between the base plate 30 and the outer plate 44 be accomplished in a low frictional manner. Therefore, some form of lubrication may be passed therebetween in order to prevent galling. It also may be desirable to include a plurality of spring biased roller assemblies between the base plate 30 and the outer plate 44. The need for lubrication is eliminated with the roller assemblies permitting low frictional movement between base plate 30 and the outer plate 44. Also, the roller assemblies insure that the low frictional movement will be continuously provided and there is no need for any periodic lubrication.

The lateral edges of the outer plate 44 of the lower mold element 26 includes ledges. The ledges are to cooperate within longitudinal depressions 54, 56 formed within the side bars 58 and 60, respectively. As a result of the cooperation of the ledges with the depressions 54 and 56, the lower molding element 26 is permitted longitudinal movement with respect to the base plate 30. However, vertical movement therebetween is limited. Secured to the aft end 62 of the lower mold element 26 is an upstanding plate 64. The plate 64 is located substantially central of the width of the lower molding element 26. Located on each side of the plate 64 are guide bars 66 and 68. The guide bars 66 and 68 are fixedly secured to the plate 44. Located adjacent each of the guide bars 66 and 68 and pivotally connected to plate 44 are pivot bars 70 and 72, respectively. Pivot bar 70 is pivotally connected to plate 44 through pin 108. The pin to connect bar 72 to plate 44 is not shown. The pivot bars 70 and 72 constitute what is termed the intermediate link in a linkage assembly which will become more apparent further on in the description. Located adjacent each of the pivot bars 70 and 72 is a guide block 74 and 76, respectively. Each of the guide blocks 74 and 76 are fixedly mounted upon plate 30.

Each of the guide bars 66 and 68 and the guide blocks 74 and 76 contain a channel. The channel for the guide bar 66 faces the channel of the guide block 74. In a similar manner the channel of the guide bar 68 faces the channel of the guide block 76. A pin 78 is mounted upon sliders 80 and 82 with the slider 80 slidingly cooperating within the channel of the guide bar 66 and the slider 82 slidingly cooperating within the channel of the guide block 74. A main link 84 is pivotally connected to the pin 78 and located in between the guide bar 66 and the guide block 74.

In a similar manner a pin 86 is pivotally connected to main link 88 and supported between the guide bar 68 and the guide block 76. The ends of the pin 86 are connected within sliders 90 and 92 with slider 90 being slidingly supported within the guide bar 68 and slider 92 being slidingly supported within the guide block 76.

Fixedly connected to the slider 92 is a guide rod 94. Guide rod 94 extends exteriorly of the guide block 76 and cooperates with a stop block 96 which in turn cooperates with the depression 54. The free end of the rod 94 is connected to an adjustable nut assembly 98.

In a similar manner a guide rod 100 is fixedly secured to a slider 82. The rod 100 extends exteriorly of the guide block 76 and extends through a stop block 102. The stop block 102 cooperates with the depression 56. An adjustable nut assembly 104 is fixedly connected to the free end of the rod 100.

The free end of the main link 84 is pivotally connected to a pin 106 which in turn is pivotally supported to the outer plate 38 of the upper mold element 24. In a similar manner, the main link 88 is pivotally connected to a pin 110 which in turn is connected to the plate 38. At the approximate mid-point of the main link 84 the pivot bar 70 is pivotally connected thereto through a pin 112. In a similar manner the pivot bar 72 is pivotally connected through a pin 114 at the approximate mid-point of the main link 88.

Rollers 120, 122, 124 and 126 are rotatably connected to the outer plate 38 on the lateral edges thereof. It is to be noted that the roller 124 is spaced inwardly with respect to the roller 122. In a similar manner the roller 126 is spaced a distance inwardly with respect to roller 120. Secured to the plate 30 and upstanding therefrom are a first pair of camming surfaces 128 and 130. Rollers 126 and 124 are to be normally in contact with the camming surfaces 128 and 130. However, when the apparatus is retracted into the press, the rollers are not in contact with the cams.

Secured to the plate 30 is a second pair of camming surfaces 132 and 134. Roller 120 is to cooperate with the camming surface 132 with roller 122 cooperating with camming surface 134.

An actuating rod 136 is fixedly connected to the plate 64. The actuating rod 136 cooperates with the piston (not shown) which is located within a cylinder 138. The cylinder 138 is to be supplied hydraulic fluid from a source (not shown) which in turn causes movement of the piston either in the fore or aft direction. This results in the corresponding movement of the actuating rod 136. The cylinder 138 is fixedly secured to the plate 30.

The operation of the first embodiment of this invention is as follows. It will be assumed that the molding apparatus 20 of this invention has just completed a molding operation and the molding elements 24 and 26 are in the closed position and located within the molding apparatus as shown in FIG. 1 of the drawings. It is then desired to effect separation of the molding elements 24 and 26 so as to remove the molded parts from the mold cavities 34 and 36.

Figure 7:
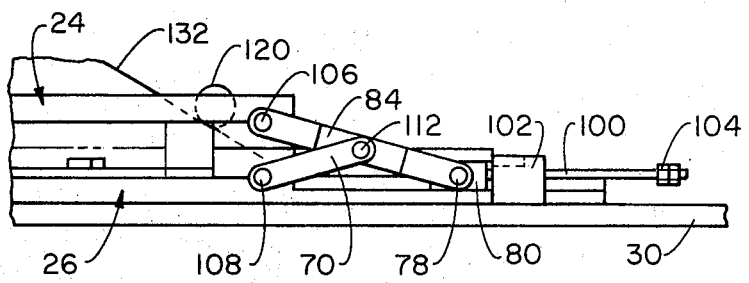
FIG. 7 is a schematic view of the linkage assembly of the first embodiment of this invention in order to effect separation of the molding elements.
Figure 8:
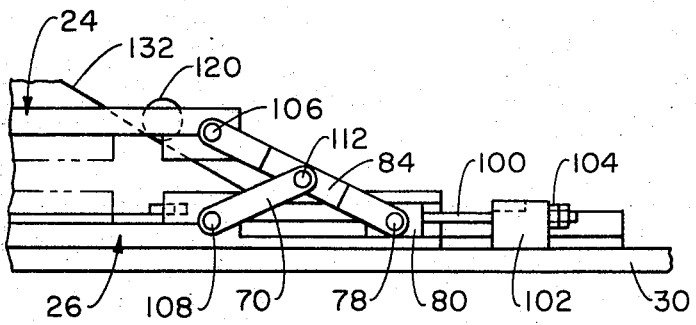
FIG. 8 is a view similar to FIG. 7 but showing the apparatus in a position to effect breaking of the upper mold element from the lower mold element.

The operator actuates a force, not shown, which in turn supplies the hydraulic fluid to within the cylinder 138 which in turn moves the piston located within the cylinder 138. The actuating rod 136 is connected to the piston and is also moved. This movement is transmitted through plate 64 to the lower molding element 26. However, the upper molding element 24 is connected to the lower molding element 26 and is also moved. As both the molding elements 26 and 24 are moved out of the molding apparatus 20, the rollers 124 and 126 are caused to contact and move along the cam surfaces 130 and 128, respectively. Also rollers 120 and 122 are caused to move along the cam surfaces 132 and 134, respectively. At the point of movement shown in FIG. 7 of the drawings, the upper molding element 24 is just broken from the lower molding element 26. This in essence is equivalent to the manual prying operation. As the molding elements 24 and 26 continue to move, the upper molding element 24 is separated a greater distance from the lower molding element 26, with the molding elements being continuously parallel.

Figure 9:
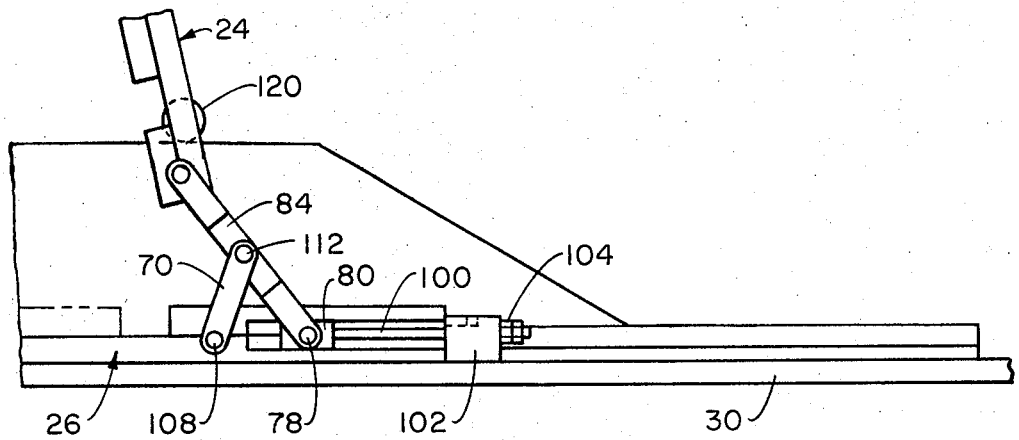
FIG. 9 is a view similar to FIG. 7 but showing the upper mold element spaced from the lower mold element.

The stop blocks 102 and 96 longitudinally "float" upon their respective rods 100 and 94. However, at a certain point established by location of the adjustable nut assemblies 104 and 98, the nut assembly comes into abutting physical contact with its respective stop block with the stop block being in abutting contact with its respective guide block 74 or 76. At this position continued longitudinal movement of the sliders 80 and 82 is prevented. However, the acutating rod 136 continues to move and likewise continues to move longitudinally the molding elements 24 and 26. This continued longitudinal movement causes the main links 84 and 88 to be pushed downward toward the lower molding element 26. However, the rollers 120 and 122 are held against their respective cams 132 and 134. As a result, the upper mold element 24 is fulcrumed about the rollers 120 and 122. This fulcruming action causes the aft position of the upper mold element 24 to be pushed downward with the fore portion of the upper molding element 24 to be pivoted upward away from the lower molding element 26. This results in a significant spacing of the upper molding element 24 from the lower molding element 26 as shown in FIG. 9 of the drawings. In this position the operator can then readily manually remove the molding elements from the mold cavities 34 and 36.

It is desirable to have the movement from the press accomplished rather quickly but with the last two or three inches of travel slowed. This can be accomplished in any of several ways as by the use of electrical switching structure or in the construction of the hydraulic piston and cylinder arrangement.

After the molded parts have been removed from the cavities 34 and 36, the operator will then merely actuate the source (not shown) in reverse which results in movement of the piston (not shown) within the cylinder 138 in the opposite direction. This results in a closing of the molding elements 24 and 26 and a withdrawal of such back into the molding apparatus 20.

Figure 10:
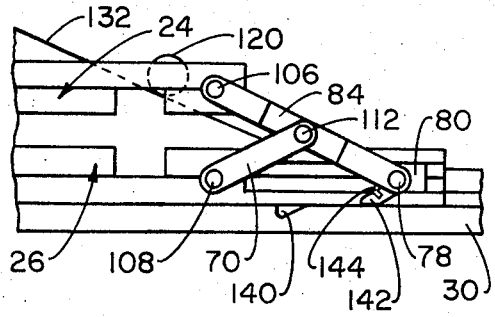
FIG. 10 is a schematic view similar to FIG. 7 but of a second embodiment of linkage assembly of this invention showing the upper mold element in the position of being initially broken from the lower mold element.
Figure 11:
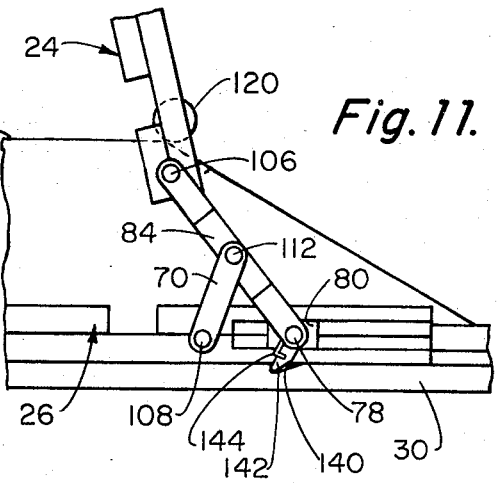
FIG. 11 is a view similar to FIG. 9 of the second embodiment of linkage assembly of this invention.
Figure 12:
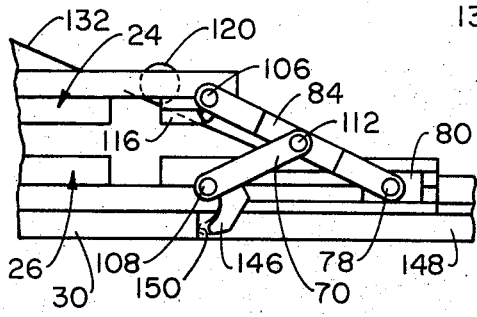
FIG. 12 is a view similar to FIG. 10 but of a third embodiment of linkage assembly of this invention.
Figure 13:
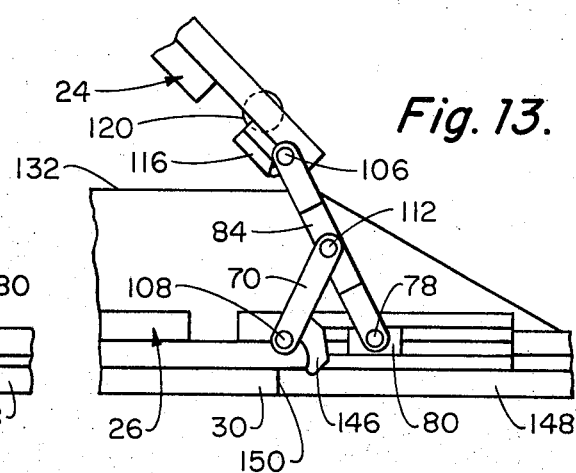
FIG. 13 is a view similar to FIG. 11 but related to the third embodiment of linkage assembly within this invention.

Within FIGS. 10 and 11 is a second embodiment of structure, and within FIGS. 12 and 13 is a third embodiment of structure which effects separation of the upper mold element 24 from the lower mold element 26. A detailed discussion of the entire operation is believed not to be necessary as essentially the operation is identical. The only difference which occurs within the second and third embodiments of this invention relates to the structure which causes the upper mold element 24 to substantially separated from the lower mold element 26 as shown in FIG. 9 of the drawings.

The second embodiment of this invention does not employ the use of the rod assemblies 194. However, located within the plate 30 at a particular location is a recess 140. Pivotally connected upon the pin 78 is a pawl 142. The pawl 142 is biased toward the plate 30 by means of a spring 144. As the molding elements 24 and 26 are moved longitudinally by the rod 136, after the initial breaking of the molding elements 24, 26 has occurred, the pawl 142 will be caused to communicate within the recess 140. It is to be understood that there will more than likely be two such pawls 142 employed with two such recesses 140 employed, one on each side of the actuating rod 136. With the pawl 142 communicating within the recess 140 further longitudinal movement of the sliders 80 and 82 is prevented. However, upon continued longitudinal movement of the molding elements 24 and 26, a substantial pivoting action of the main links 84 and 88 occurs which results in the upper molding element 24 being substantially spaced from the lower molding element 26 as shown in FIG. 11 of the drawings. Upon closing of the mold and withdrawal of such into the molding apparatus 20, the pawl 142 is merely extracted from the recess 140.

The third embodiment of structure within this invention accomplishes the same result in a slightly different manner. A pawl 146 is fixedly secured to the intermediate link 70. Also, it is to be understood that a similar pawl would be connected to the other intermediate link 72. The pawl 146 is in continuous cooperation with a slot 148 formed within the plate 30. The slot 148 ends in a wall 150. Upon the pawl 146 coming into contact with the wall 150, further longitudinal movement of the sliders 80 and 82 is prevented.

As actuating rod 136 continues to move the molding elements 24 and 26 longitudinally, a pivoting action, which is opposite in direction to the pivoting action of the previous embodiment, occurs about the main links 84 and 88. As a result, the rollers 120 and 122 are displaced from their respective cam surfaces 132 and 134 as shown in FIG. 13 of the drawings. This position permits the operator to easily remove the molding elements from the mold cavity.

In this third embodiment, in order to prevent the upper molding element 24 from pivoting downward with respect to the main links 84 and 88 when it is located in the position of FIG. 13, a pair of pivot stops 116 and 118 are employed. Pivot stop 116 is connected to the plate 38 and is adapted to come into contact with the main link 84 to limit the amount of pivot movement of the main link 84 with respect to the plate 38 in the counterclockwise direction (as shown in FIG. 13 of the drawings). In a similar manner, pivot stop 118 is secured to the opposite of the plate 38 as is adapted to come into contact with the main link 88.

What is claimed is:

1. A molding apparatus including a housing and upper and lower molding elements supported upon said housing, said molding elements to cooperate together to form a mold cavity, means connected to at least one of said molding elements to move both said molding elements in a substantially lineal direction and in respect to said housing, second means for separating said molding elements adjacent the outward extremity of the movement of said molding elements, said second means comprising:

cam means connected to said housing;
follower means connected to at least one of said molding elements, said follower means to normally be in contact with said cam means; and
a linkage assembly connected between said molding elements, said linkage assembly includes a third means to produce substantial separating of said molding elements.

2. Apparatus as defined in claim 1 wherein:
said linkage assembly includes a main link and an intermediate link, one end of said main link connected to said upper molding element, the free end of said main link being pivotally connected to a guide block, said guide block being guidably movable within track means, said track means being secured to said housing, said intermediate link being pivotally connected to said main link and also being pivotally connected to said housing.

3. Apparatus as defined in claim 2 wherein:
said follower means comprises a low frictional roller connected to said upper molding element.

4. Apparatus as defined in claim 3 wherein:
an elongated rod fixedly connected to said guide block, fourth means connected to said rod, stop means mounted upon said housing, said fourth means to come into contact with said stop means adjacent the outward extremity of the lineal movement of said molding elements, whereby upon said stop means coming into contact with said fourth means further lineal movement of said molding elements results in pivoting movement of said main link with respect to said guide block, thereby resulting in substantial inclining of said upper molding element from said lower molding element.

5. Apparatus as defined in claim 4 wherein:
said fourth means includes a member movably mounted upon said rod, said fourth means further includes a nut assembly attached to the free end of said rod, said nut assembly being adjustable.

6. Apparatus as defined in claim 3 wherein:
hiatus means formed within said housing, pawl means connected to said linkage assembly, said pawl means to be capable of contacting said hiatus, upon said pawl means communicating with said hiatus, pivotal movement of said main link occurs with respect to said guide block as continued further lineal movement occurs of said molding elements, thereby resulting in substantial inclination of said upper mold element from said lower mold element.

7. Apparatus as defined in claim 6 wherein:
said hiatus comprises an opening within said housing.

8. Apparatus as defined in claim 7 wherein:
said opening within said housing comprises a recess, said pawl being pivotally mounted to said main link adjacent said guide block, biasing means located between said pawl and said guide block to continuously bias said pawl toward said housing.

9. Apparatus as defined in claim 8 wherein:
said biasing means comprises a spring.

10. Apparatus as defined in claim 7 wherein:
said pawl being fixedly mounted upon said intermediate link, said opening comprising an elongated aperture, upon said pawl coming into contact with the end wall of said aperture and upon continued lineal movement of said molding elements substantial pivoting occurs of said main link with respect to said guide block resulting in substantial spacing of said upper mold element from said lower mold element.

11. Apparatus as defined in claim 10 wherein:
said pawl being in continuous engagement with said elongated aperture.

* * * * *